United States Patent
Drummond

(10) Patent No.: US 8,899,566 B2
(45) Date of Patent: Dec. 2, 2014

(54) FOOD CUTTING BOARD

(76) Inventor: Graham Noel Drummond, Nelson (NZ)

(*) Notice: Subject to any disclaimer, the term of this patent is extended or adjusted under 35 U.S.C. 154(b) by 375 days.

(21) Appl. No.: 13/379,892

(22) PCT Filed: Jul. 6, 2010

(86) PCT No.: PCT/NZ2010/000140
§ 371 (c)(1),
(2), (4) Date: Dec. 21, 2011

(87) PCT Pub. No.: WO2011/005120
PCT Pub. Date: Jan. 13, 2011

(65) Prior Publication Data
US 2012/0091646 A1    Apr. 19, 2012

(30) Foreign Application Priority Data
Jul. 7, 2009   (NZ) ....................................... 578220

(51) Int. Cl.
*B25H 1/04* (2006.01)
*A47J 47/00* (2006.01)
*B26B 29/06* (2006.01)

(52) U.S. Cl.
CPC ............ *A47J 47/005* (2013.01); *B26B 29/063* (2013.01)
USPC ..................... 269/293; 269/289 R; 269/302.1

(58) Field of Classification Search
USPC .......................................... 269/289 R, 302.1
See application file for complete search history.

(56) References Cited

U.S. PATENT DOCUMENTS

| | | | |
|---|---|---|---|
| 3,987,694 A | 10/1976 | Kaufman | |
| 4,094,221 A | 6/1978 | Jacoby | |
| 4,811,642 A | 3/1989 | Sorbie | |
| 6,564,685 B1 | 5/2003 | Beaton | |
| 8,201,813 B2* | 6/2012 | Maciejewski et al. | 269/60 |
| 8,262,071 B2* | 9/2012 | Huang | 269/289 MR |
| 8,276,898 B2* | 10/2012 | Avoyan et al. | 269/21 |
| 8,393,605 B2* | 3/2013 | Yang et al. | 269/287 |
| 8,430,387 B2* | 4/2013 | Roser | 269/290 |
| 2012/0091646 A1* | 4/2012 | Drummond | 269/293 |
| 2014/0021672 A1* | 1/2014 | Fiala | 269/289 R |

FOREIGN PATENT DOCUMENTS

| | | |
|---|---|---|
| CN | 2868142 | 2/2007 |
| GB | 844880 | 8/1960 |
| JP | 2002291626 | 10/2002 |

OTHER PUBLICATIONS

International Search Report dated Sep. 14, 2010 corresponding to International Patent Application No. PCT/NZ10/00140.

* cited by examiner

*Primary Examiner* — Lee D Wilson
(74) *Attorney, Agent, or Firm* — Ohlandt Greeley Ruggiero & Perle LLP

(57) ABSTRACT

A cutting board wherein a pair of opposed posts are attached near an edge of a top cutting surface and include facing closed slots therein. A retaining bar is located in the slots in the opposed posts and a compression spring provides a downward bias to the retaining bar in a manner which enables the retaining bar to move vertically with respect to the cutting surface. The apparatus facilitates cutting a variety of items using a preferred type of knife commonly referred to as a chef's knife. When an item to be cut is placed on the cutting surface of the board, and the point of the knife engage the retaining bar, the cutting of an item is enhanced and facilitated through the lever action of the knife and the biased retaining bar serving as a fulcrum.

11 Claims, 3 Drawing Sheets

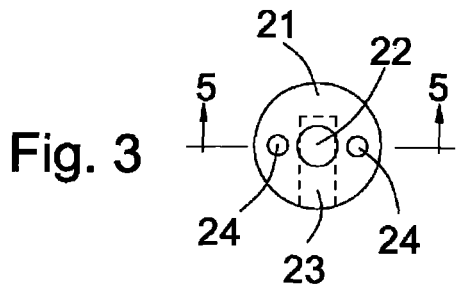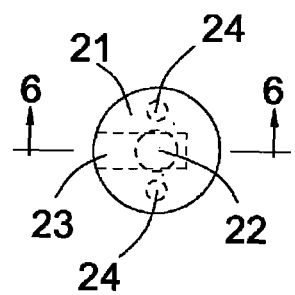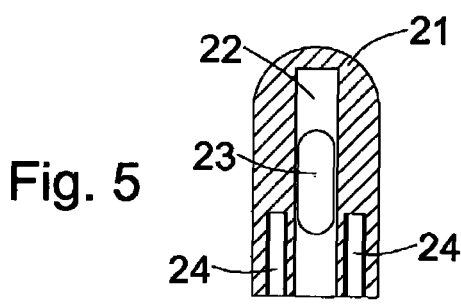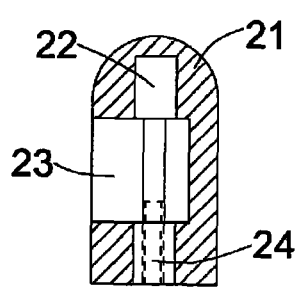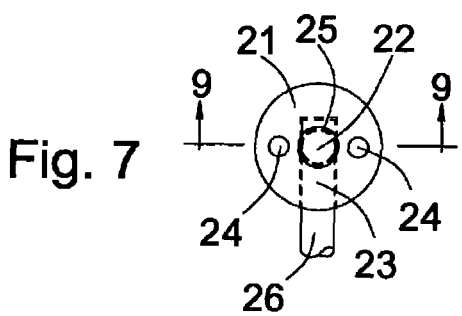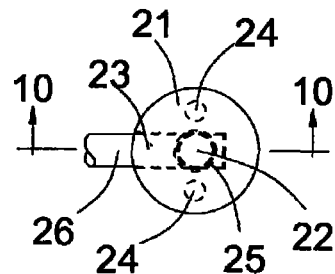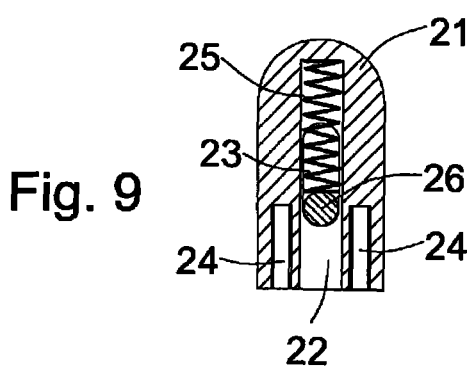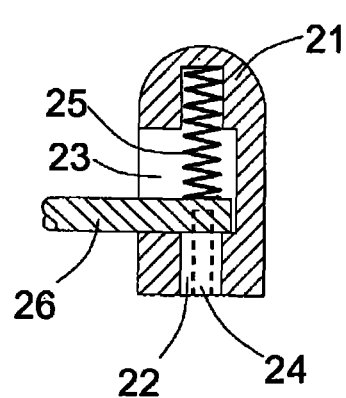

FOOD CUTTING BOARD

CROSS-REFERENCED APPLICATIONS

This application claims the benefit of New Zealand provisional patent application No. 578220, filed 7 Jul. 2009, and is the national phase application of International Application No. PCT/NZ2010/000140, filed on 6 Jul. 2010, both of which are incorporated by reference in their entirety.

BACKGROUND

1. Field of the Invention

The present invention relates generally to a cutting board wherein a pair of opposed posts are attached near an edge of a top cutting surface and include facing closed slots therein. A retaining bar is located in the slots in the opposed posts and a compression spring provides a downward bias to the retaining bar in a manner which enables the retaining bar to move vertically with respect to the cutting surface.

2. Discussion of the Background Art

The world is experiencing an increasing aging population and a growing number of people living with a physical disability or illness, affecting their ability to maintain their independence in their own home. The everyday task of preparing meals is often made more difficult by a person's inability to use a standard kitchen knife, when preparing food in the domestic kitchen. Their disability or ailment may mean they have insufficient ability or strength to grip and hold a kitchen knife effectively to chop or slice food items.

Cutting boards for use in cutting various types of foodstuffs are well known, as are several types of knives to be used in combination with such boards. A preferred type of knife for such use is one with a sturdy blade commonly referred to as a "chef's knife".

Variations on the theme of the combination of the cutting board and knife are also known, as are levered apparatus useful in cutting different types of food. The following patents disclose different forms of levered cutting devices:

U.S. Pat. No. 4,094,221
U.S. Pat. No. 4,811,642
U.S. Pat. No. 6,546,685

U.S. Pat. No. 4,094,221 issued Jun. 13 1978, discloses a cutting board attachment for use with a conventional kitchen knife. The attachment includes a fulcrum support member adapted for use in an upright disposition with respect to a cutting board. A means is provided for mounting the support member so as to be stationary with respect to the cutting board.

A means is provided on the support member for providing a plurality of slots, acting as fulcrums at different elevations for receiving the tip of a knife, and for contact with the upper edge of the cutting blade adjacent the tip end so that the cutting blade can be used as a lever, pivotable downwardly about the fulcrums, for cutting objects such as frozen food on the cutting board.

The user is restricted to an area adjacent the front of the selected slot, limiting the available work area of the cutting surface. If the knife is rotated to far from the perpendicular when the knife tip is engaged in the slot, there is an increased chance of the knife tip binding or potentially breaking off in the slot.

U.S. Pat. No. 4,811,642 issued Mar. 14 1989, discloses a kitchen guillotine in which a chopping board is provided with a pivotable sleeve device in which a kitchen knife may be inserted, so that a chopping action can be achieved by moving the knife handle up and down.

Once the tip of a knife engages the pivotable device it eliminates the ability for the knife to be used in a slicing action and limits its function to a chopping action only.

U.S. Pat. No. 6,564,685 issued May 20 2003 discloses a cutting board and leveraged knife apparatus which facilitates cutting of a variety of objects. The cutting board includes a vertically oriented support member extending therefrom, with a plurality of fulcrums positioned at intervals upwardly from the cutting board. The apparatus includes a knife, having in its blade approximate its tip, means for removeably engaging a convenient one of the fulcrums. When an item to be cut is placed on the cutting board adjacent the support member, and the knife engages with a convenient fulcrum, cutting of the item is enhanced and facilitated through the lever action of the knife and fulcrum.

A user is limited to using the area of the cutting surface immediately adjacent the vertical orientated support member. If a user employs one of the fulcrum and the knife is rotated too far from the perpendicular, there is a risk the knife tip may bind or potentially snap. A knife with means to engage one of the fulcrums such as a notch, would prevent the knife from being moved backwards and forwards in a slicing motion, while engaged with a fulcrum.

SUMMARY

In accordance with one embodiment comprising a cutting board, a pair of opposed posts attached near an edge of a top cutting surface and include facing closed slots therein. A retaining bar is located in the slots in the opposed posts and a compression spring provides a downward bias to the retaining bar in a manner which enables the retaining bar to move vertically with respect to the top cutting surface.

Accordingly several advantages of one or more aspects are as follows: to provide a levered cutting apparatus that uses a standard chef knife, of a type commonly found in domestic kitchens or readily available from retails stores. The entire top cutting surface of the cutting board can be utilised, in combination with the biased retaining bar. The user is not restricted to having to use an area immediately adjacent or perpendicular to any specific fixed fulcrum mechanism.

The retaining bar has a variable bias over its length, having the least downward bias at each end and the most downward bias in the center. This enables a user to choose the amount of downward bias desired on the tip of the knife to facilitate the easiest chopping or slicing action.

The bottom cutting surface can be used, to cut, chop and slice a variety of items, using the knife in a conventional manner, without the assistance of a biased retaining bar. The bottom cutting surface provides an alternative work surface, eliminating the potential for cross contamination when different food types share the same work surface.

The board and components requires no assembly or disassembly for cleaning or storage and has no moving parts that require manual adjustment. The cutting board stands on any flat surface without additional support resulting in a small footprint, enabling the board to be stored on a bench for quick and easy access, particularly by disabled or elderly users. Because the cutting board stands it allows it to air dry, avoiding the possibility of a build up of bacteria on the cutting surfaces, which can occur if a cutting board is stored flat while still damp.

The cutting board is made from components which can be placed in a domestic dishwasher and all the components are made from materials that can be recycled. Other advantages of one or more aspects will be apparent from a consideration of the drawings and ensuing description.

BRIEF DESCRIPTION OF THE DRAWINGS

In the accompanying drawings:

FIG. 3 is a bottom view of a post in accordance with one embodiment.

FIG. 4 is a top view of a post in accordance with one embodiment.

FIG. 5 is a section view taken along the line 5-5 in FIG. 3

FIG. 6 is a section view taken along the line 6-6 in FIG. 4

FIG. 7 is a bottom view of a post with components in accordance with one embodiment.

FIG. 8 is a top view of a post with components in accordance with one embodiment.

FIG. 9 is a section view taken along the line 9-9 in FIG. 7 with components in accordance with one embodiment.

FIG. 10 is a section view taken along the line 10-10 in FIG. 8 with components in accordance with one embodiment

DETAILED DESCRIPTION OF THE PREFERRED EMBODIMENT

Figure 1:
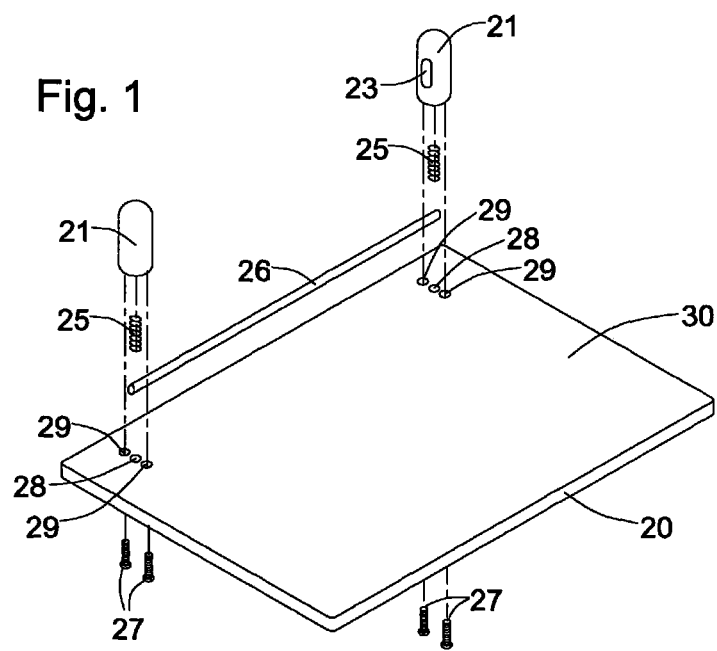
FIG. 1 is a perspective view of the components of a cutting board in a disassembled orientation and showing each of the components separately in accordance with one embodiment.

A detailed description of the food cutting board and preferred embodiments is best provided with reference to the drawings wherein FIG. 1 is a perspective view of the components of a cutting board 20 in a disassembled orientation and showing each of the components separately in accordance with one embodiment. I presently contemplate that the board 20 having a top cutting surface 30 of any conventional size and shape fabricated in any suitable material. Near one edge of the board 20, a twin pair screw holes 29, and a drain hole 28 equidistance between the holes 29. I presently contemplate that the holes 28 and holes 29 with a 4 mm outside diameter be machined through the board 20. However it could have different sizes. However the holes 28 and holes 29 could be formed using a different method such as plastic moulding. The distance between the two pair of holes 29 is predetermined by the length of a retaining bar 26.

I presently contemplate that a mammillated post 21 of the embodiment of FIG. 1 has a round cross section 30 mm outside diameter and made of a thermoplastic.

However it could have different cross sections such as oval, rectangular, square and different sizes and different materials such as stainless steel.

I presently contemplate that the bar 26 of the embodiment of FIG. 1 has a round cross section 8 mm outside diameter and predetermined length made of stainless steel. However it could have different sizes and materials such as thermoplastic.

I presently contemplate that a compression spring 25 of the embodiment of FIG. 1 has a round cross section 9.8 mm outside diameter and a predetermined length made of stainless steel. However it could be another biasing arrangement and have different sizes and materials such as thermoplastic.

I presently contemplate that a machine screw 27 of the embodiment of FIG. 1 has a thread 4 mm outside diameter and made of stainless steel. However it could have different sizes and materials such as thermoplastic.

FIGS. 3 and 4 show bottom and top views of the post 21 in accordance with one embodiment showing a blind hole 22, a closed slot 23, and a threaded hole 24

FIG. 5 is a section view taken along the line 5-5 in FIG. 3 showing the post 21, hole 22, and slot 23. The hole 22 has an outside diameter of 10 mm and a predetermined depth. However it can have different sizes. The width of the slot 23 being less than the outside diameter of the hole 22. The distance from the base of the post 21 to the bottom of the slot 23 is 15 mm. However in can have different sizes. The height of the slot 23 is 25 mm. However in can have different sizes. The hole 24 has a diameter of 4 mm and a predetermined depth. However it can have different sizes.

FIG. 6 is a section view taken along the line 6-6 in FIG. 4 showing the post 21, hole 22, slot 23, and hole 24. The slot 23 intersects the hole 22 extending past the outside wall of the hole 22 finishing with a flush base.

FIGS. 7 and 8 show bottom and top views of the post 21 with components in accordance with one embodiment showing the hole 22, slot 23, holes 24, spring 25, and the bar 26.

FIG. 9 is a section view taken along the line 9-9 in FIG. 7 showing the post 21, hole 22, slot 23, holes 24, spring 25, and bar 26. The diameter of the bar 26 is less than the width of the slot 23. The width of the slot 23 is less than the outside diameter of the spring 25, preventing the spring 25 from exiting the hole 22 through the slot 23

FIG. 10 is a section view taken along the line 10-10 in FIG. 8 showing the post 21, hole 22, slot 23, hole 24, spring 25, and bar 26. The spring 25 is inserted into the hole 22 and partially compressed against the top of the hole 22, one end of the bar 26 is inserted into the slot 23 and abut the flush base of the slot 23. The bar 26 extends past the outside wall of the hole 22 abutting the flush base of the slot 23 ensuring the bottom of the spring 25 remains perpendicularly adjacent the top of the bar 26.

FIG. 1 shows the first post 21 is fixed through the holes 29 in the board 20 and secured with screws 27. The second post 21 is fixed through the holes 29 in the board 20 and secured with screws 27.

Figure 2:
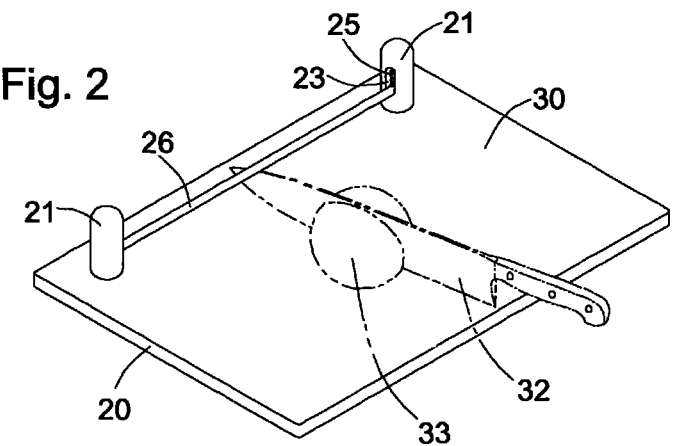
FIG. 2 is an overall perspective view of a cutting board in use with a knife in phantom cutting an item in phantom in accordance with one embodiment.

FIG. 2, shows in accordance with one embodiment the board 20 of wherein the pair of opposed posts 21 are attached near an edge of the surface 30 of the board 20 and include facing opposed slots 23 therein. The bar 26 is located in the slots 23 in the opposed posts 21. The spring 25 provides a downward bias to the bar 26 in a manner which enables the bar 26 to move vertically with respect to the surface 30 of the board 20 wherein the tip of a typical chefs knife 32 in phantom which blade is typically 150-300 mm in length is engaged the bar 26. When an item 33 in phantom to be cut is placed on the cutting surface 30 of the board 20, and the point of the knife 32 engage the retaining bar 26, the cutting of an item 33 is enhanced and facilitated through the lever action of the knife 32 and the biased retaining bar 26 serving as a fulcrum.

Figure 11:
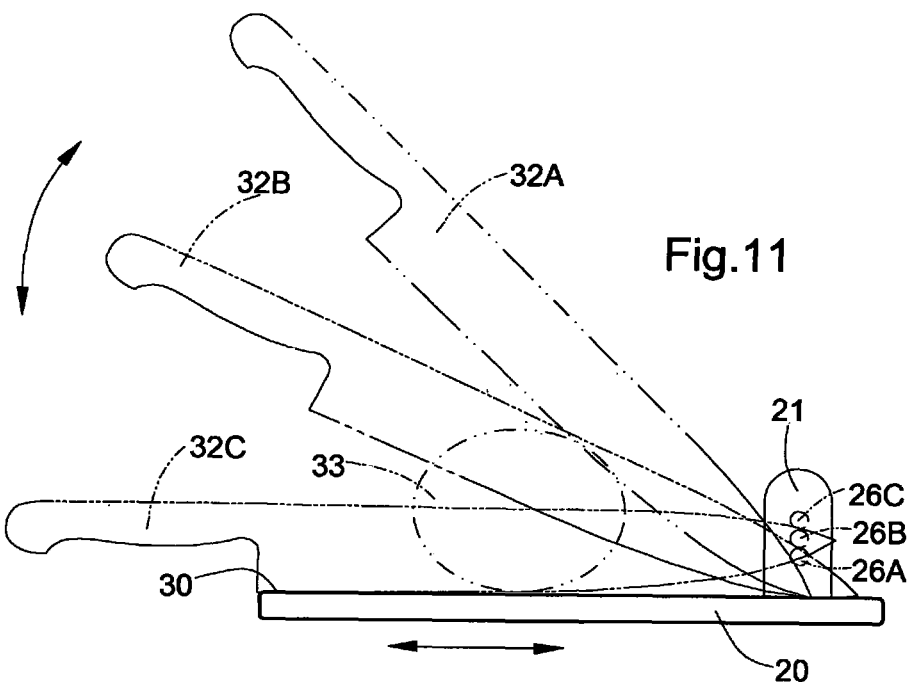
FIG. 11 is a side view of a cutting board showing several possible positions of a knife and bar in phantom as it may be employed in cutting through an item in phantom in accordance with one embodiment.

FIG. 11 shows several possible positions of a knife 32A-32C in phantom as it may be employed in cutting through an item 33, using the surface 30 of the board 20 in accordance with one embodiment. Upon insertion of the tip of the knife 32A under the bar 26A in phantom, caused to engage the bar 26A which acts as a fulcrum and allow the knife 32A to be levered downwardly, as indicated by the arrow, as the item 33 is cut.

Various stages of a cutting operation are depicted. In the uppermost of the diagrams of the knife 32A-32C is shown engaged by means of the tip with initial cut of the item 33 is begun. As the knife 32A is forced downwardly, indicated by the arrow, this initial cut is completed at the position indicated by 32C. Cuts of smaller items may be begun at position 32B completing the cut at 32C.

The bar 26A-C in phantom is depicted in a plurality of positions, moves in a vertical orientation dependent on the downward effort applied to the knife 32A-32C, resulting in increased control over the knife combined with minimal effort.

The bar 26A-C provides greater stability for the knife 32A-32C during rapid up and down motions, as indicated by the double headed arrow shown, as well as a forward and backward motion, as indicated by the doubled headed arrow shown, or any combination of directions, a technique employed when slicing softer fruits & vegetables or the like.

Figure 12:
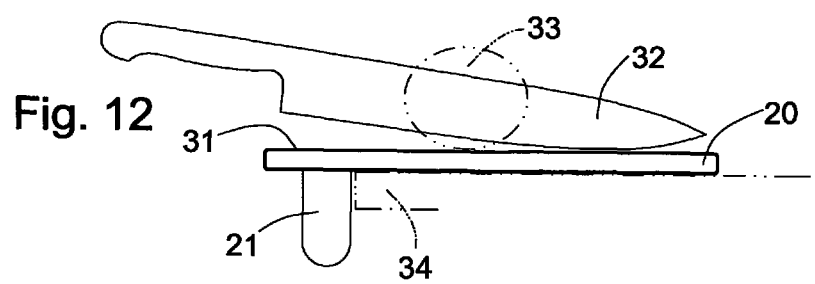
FIG. 12 is a side view of a cutting board showing a knife in phantom cutting an item in phantom on a bottom cutting surface in accordance with one embodiment.

FIG. 12 shows a bottom cutting surface 31 of the board 20 using a knife 32 to cut the item 33 in accordance with one embodiment. The board 20 with the bottom cutting surface 31 facing upwards and positioned at the edge of a bench 34 in phantom. The posts 21 prevent the board 20 moving forward on the bench 34. However the board 20 could be placed over the edge of any flat work surface. The knife 32 is employed in a conventional manner to cut and slice the item 33.

Figure 13:
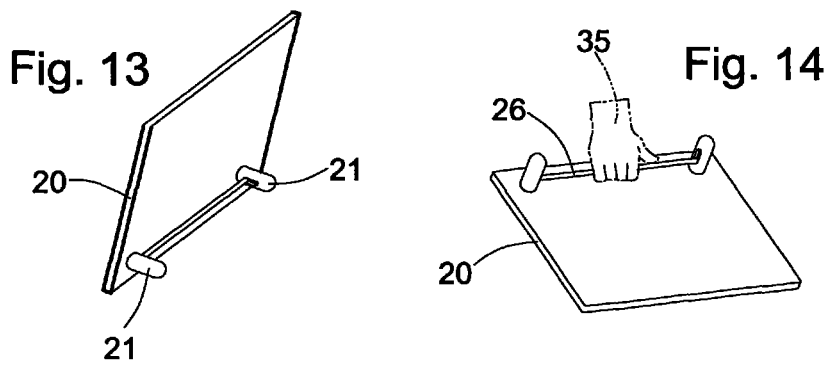
FIG. 13 is a perspective view of a cutting board showing capability to stand without additional support in accordance with one embodiment.

FIG. 13 shows the capability of the board 20 to stand on any flat surface with the aid of the posts 21 without additional support in accordance with one embodiment.

Figure 14:
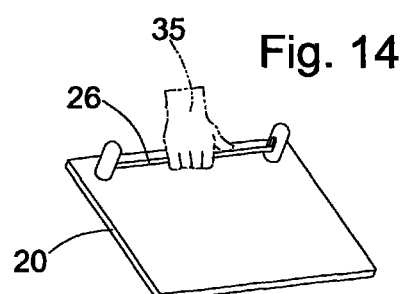
FIG. 14 is a perspective view of a cutting board showing capability to be picked up and carried using one hand in phantom using the retaining bar in accordance with one embodiment.

FIG. 14 shows the capability for the board 20 to be picked up and carried using the bar 26 using a hand 35 in phantom.

What is claimed is:

1. A cutting board which includes a top cutting surface, and an elongate retaining bar, wherein at least one end of said retaining bar is mounted in a support positioned near an edge of said top cutting surface in a manner which enables said retaining bar to move vertically with respect to said top cutting surface, and to provide a downward force urging said retaining bar towards said top cutting surface, wherein said support contains a biasing means to bias said retaining bar towards said top cutting surface.

2. A cutting board which includes a top cutting surface, and a retaining bar, a pair of opposed support posts, and a spring wherein said opposed support posts are attached near an edge of said top cutting surface, and include facing closed slots therein and said retaining bar is located in said closed slots in said opposed support posts and said spring provides a downward bias to said retaining bar in a manner which enables said retaining bar to move vertically with respect to said top cutting surface.

3. The cutting board of claim 1 wherein the said cutting board is formed from plastic.

4. The cutting board of claim 1 wherein the said retaining bar is formed from plastic.

5. The cutting board of claim 1 wherein the said retaining bar is formed from metal.

6. The cutting board of claim 1 wherein each end of said retaining bar is mounted in a support containing a biasing means to bias said retaining bar towards said top cutting surface.

7. The cutting board of claim 2 wherein each of the said posts is formed from plastic.

8. The cutting board of claim 2 wherein each of the said posts is formed from metal.

9. The cutting board of claim 1 wherein all components thereof are dishwasher safe.

10. The cutting board of claim 2 wherein said cutting board includes a mechanism to inhibit movement of the cutting board.

11. The cutting board of claim 10 wherein said mechanism comprises said pair of opposed support posts, which project outward from said top cutting surface, to prevent movement of said cutting board on a bench or other work surface.

\* \* \* \* \*